United States Patent
Cruise

(10) Patent No.: US 10,724,602 B2
(45) Date of Patent: Jul. 28, 2020

(54) STRAP ENCLOSURE FOR COMPRESSION WITH FAIL SAFE FEATURE

(71) Applicant: Jonathan Corey Cruise, Austin, TX (US)

(72) Inventor: Jonathan Corey Cruise, Austin, TX (US)

(*) Notice: Subject to any disclaimer, the term of this patent is extended or adjusted under 35 U.S.C. 154(b) by 0 days.

(21) Appl. No.: 16/350,023

(22) Filed: Sep. 13, 2018

(65) Prior Publication Data

US 2019/0128374 A1   May 2, 2019

Related U.S. Application Data

(60) Provisional application No. 62/606,584, filed on Sep. 27, 2017.

(51) Int. Cl.
*F16G 11/12* (2006.01)
*A44C 5/00* (2006.01)
*A43C 11/14* (2006.01)

(52) U.S. Cl.
CPC .............. *F16G 11/12* (2013.01); *A43C 11/14* (2013.01); *A44C 5/0053* (2013.01); *A43C 11/1493* (2013.01); *A44D 2205/00* (2013.01)

(58) Field of Classification Search
CPC ...... F16G 11/12; A43C 11/14; A43C 11/1493; A44C 5/0053; A44D 2205/00
See application file for complete search history.

(56) References Cited

U.S. PATENT DOCUMENTS

| | | | | |
|---|---|---|---|---|
| 2,754,560 A | * | 7/1956 | Warner | B64D 17/32 24/196 |
| 6,056,243 A | * | 5/2000 | Prentice | A63H 27/002 244/155 A |
| 7,300,410 B1 | * | 11/2007 | Weber | A61F 5/37 128/878 |
| 2002/0092138 A1 | * | 7/2002 | Spiller | A01K 27/001 24/306 |
| 2002/0139823 A1 | * | 10/2002 | Johnson | A45C 13/26 224/250 |
| 2006/0052735 A1 | * | 3/2006 | Jablonka | A61F 13/04 602/75 |
| 2012/0266367 A1 | * | 10/2012 | Sandor | A61F 9/027 2/431 |
| 2016/0183666 A1 | * | 6/2016 | Whitehill | A45F 3/02 224/578 |
| 2016/0213136 A1 | * | 7/2016 | Roehrig | A45F 5/00 |

* cited by examiner

*Primary Examiner* — Robert Sandy
*Assistant Examiner* — David M Upchurch
(74) *Attorney, Agent, or Firm* — Craige Thompson; Thompson Patent Law

(57) ABSTRACT

A strap enclosure that, when the two fastener tongues are looped through a ring on the opposite end, cinches and applies compression forces in a constrictive way and fastens on both left and right sides with a fastener, with a consequential fail-safe, double redundant feature.

18 Claims, 3 Drawing Sheets

STRAP ENCLOSURE FOR COMPRESSION WITH FAIL SAFE FEATURE

CROSS REFERENCE TO RELATED APPLICATIONS

This nonprovisional utility patent application claims the benefit of provisional utility patent application No. 62/606,584

STATEMENT REGARDING FEDERALLY SPONSORED RESEARCH OR DEVELOPMENT (IF APPLICABLE)

Not Applicable

REFERENCE TO SEQUENCE LISTING, A TABLE, OR A COMPUTER PROGRAM LISTING COMPACT DISC APPENDIX (IF APPLICABLE)

Not Applicable

BACKGROUND OF THE INVENTION

Common hook and loop fastener straps have been used for decades on many items such as footwear, watches, bags, military equipment, and medical devices. These common straps may hold gear or items on or against the user, or secure items onto other objects. These straps consist of a single strap, hook and loop, and a receiver ring in which to insert the single strap, pull to tighten the device, and then fasten it using the hook and loop fastener. For clarity, the end of the straps that are inserted into the receiver rings will be referred to as "tongues".

The design of common hook and loop fastener strap pulls one side of the item (i.e. sides of footwear) toward the opposite side. This creates a high tension area and rigid area of the strap, potential uncomfortable pressure points for the user, and further limits ergonomics and comfort when tension is increased. In addition, the mechanics of the common fastener strap design are limited in creating tension, and can fail when under high tension.

Therefore, a need exists in the field for a novel strap enclosure for users to create higher tension and disperse that tension more evenly.

BRIEF SUMMARY OF THE INVENTION

The present invention comprises a "Y" shaped novel strap enclosure with a fail safe/double redundancy design that, when the two fastener tongues are looped through a receiving ring on the opposite end and are cinched, applies compression forces in a mechanically constrictive way, with the two fastener tongues fastening to both the left and right sides of the novel strap enclosure, to be used on ski boots, sports boots and sports footwear, medical compression devices (pelvic sling).

BRIEF DESCRIPTION OF THE SEVERAL VIEWS OF THE DRAWING

Some of the embodiments of the present invention are illustrated as an example and are not limited by the figures in the accompanying drawings.

Figure 1A:
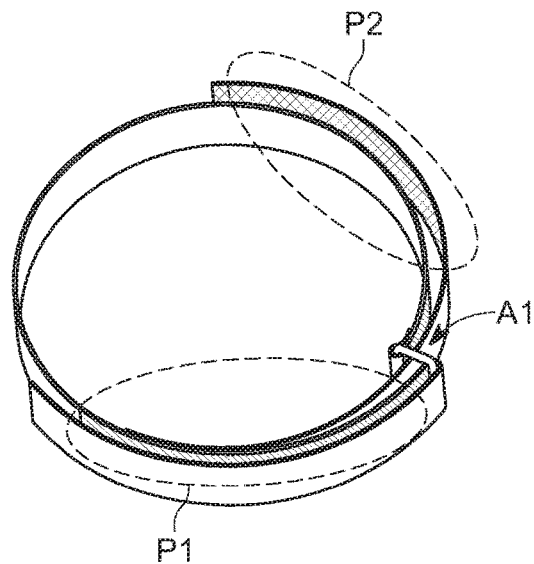
FIG. 1A depicts a top perspective view of an exemplary strap enclosure.

An exemplary strap enclosure may include a main strip (1.2) extending from a first end (E1) and a second end (E2) and having a first side (S1) and a second side (S2). The main strip may include a first fastener tongue (1.0) located at the first end. The main strip may include a main strip coupler (1.3) located at the second end. The main strip may include an intermediate strip portion (1.4) extending between the first fastener tongue and the first fastener coupler. The strap enclosure may include a secondary strip (1.5) comprising a second fastener tongue (1.1) extending from a third end (E3) and a fourth end (E4) and having a third side (S3) and a fourth side (S4). The third end may be attached to the main strip at a fixed attachment point (3.2) along the intermediate strip portion. The strap enclosure may include a receiver coupler (2) defining at least one receiver aperture (A1). The receiver coupler may include a first portion (2.1) and a second portion (2.2), the first portion and the second portion being located on opposite sides of the at least one receiver aperture and the at least one receiver aperture receiving the main strip and the second fastener tongue.

The first fastener tongue may include a first fastener (F1) located at the first side of the main strip. The main strip may include a second fastener (F2) located at the first side of the main strip along the intermediate strip portion, and configured to releasably fasten with the first fastener. The main strip may include a third fastener (F3) located at the first side of the main strip and along the intermediate strip portion. The secondary strip may include a fourth fastener (F4) located at the fourth side of the second fastener tongue, and configured to releasably fasten with the third fastener.

The main strip coupler may be retainingly coupled to the receiver coupler at the first portion at an area (3.1). The main strip may be looped around the second portion of the receiver coupler. The first and second fasteners may be a first pair of hook and loop fasteners, and the third and fourth fasteners may be a second pair of hook and loop fasteners. When the first and second fastener tongues are inserted through the at least one receiver aperture and pulled in opposite lateral directions to cinch the strap enclosure, the strap enclosure may be configured to apply inwardly and radially-directed compression forces throughout the strap enclosure that can be applied to a user with no rotation of the strap enclosure and allows fastening of each tongue on each tongue's respective fastening area of the strap enclosure. The fastening may be at a first fastening point (P1) associated with the first and second fasteners and a second fastening point (P2) associated with the third and fourth fasteners to provide for a double-redundant fastening feature of the strap enclosure. When the strap enclosure is closed, the second fastener tongue may be located between the first portion and the main strap within the at least one receiver aperture.

DETAILED DESCRIPTION OF THE INVENTION

The terms used herein are for the purpose of describing certain embodiments only and are not intended to be limiting of the invention. As used herein, the term "and/or" includes any and all combinations of one or more of the associated listed items. Used herein, the terms "a", "an" and "the" are intended to include both the plural and singular forms, unless context clearly shows otherwise. The terms "comprising" and/or "comprises" when used in this specification are understood to specify the presence of stated features, steps, operations, components and/or elements, but do not necessarily preclude one or more other features, steps, operations, components, elements or groups thereof.

Unless defined otherwise, all terms including technical or scientific terms, used herein have the same commonly understood meanings, and are commonly understood by someone having ordinary skill in the art in which this invention belongs. It will be understood that the meaning of these terms should be interpreted as having meanings that are consistent with their meanings in the context of the relevant art and present disclosure and are not to be interpreted in overly formal or idealized senses unless so defined expressly herein.

It will be understood that a number of steps and techniques will be disclosed in the describing of this invention. Each step or technique is beneficial and can be used in conjunction with one, more than one, or all of the other disclosed techniques. The description will refrain from the unnecessary repetition of possible combinations for the sake of clarity and brevity. Nevertheless, claims and specifications of this application should be read in the understanding that said combinations are entirely within the scope of the invention and it's claims.

Novel strap enclosure designs utilizing hook and loop fastener and the like are discussed herein. In this description, numerous and specific details are given in order to provide a thorough understanding of the present invention. However, it will be evident to someone skilled in the art that the present invention may be practiced without these specific details.

The present disclosure is not intended to limit the invention to the specific embodiments illustrated by the figures or description below.

Figure 1B:
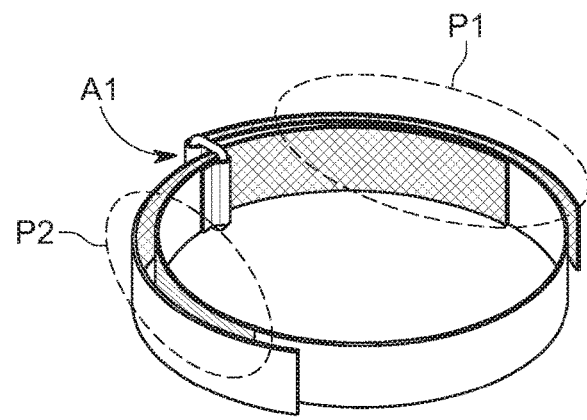
FIG. 1B depicts a first side perspective view of an exemplary strap enclosure.
Figure 1C:
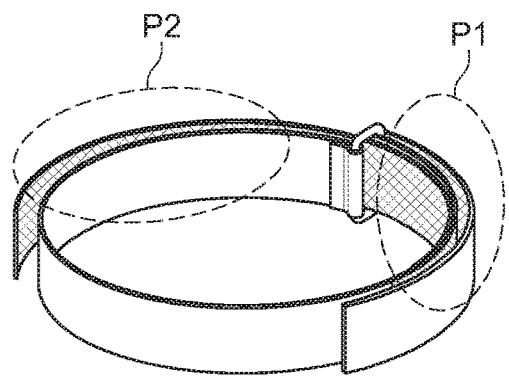
FIG. 1C depicts a second side perspective view of an exemplary strap enclosure.
Figure 1D:
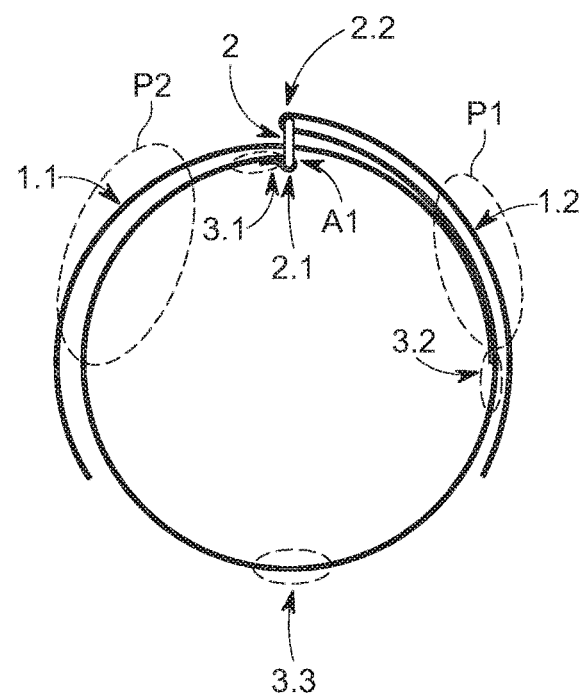
FIG. 1D depicts a top plan view of an exemplary strap enclosure.

The present invention will now be described referencing the appended figures representing preferred embodiments. FIGS. 1A-1D depict perspective views and a numbered overhead view of the complete novel strap enclosure only. The complete design, according to various embodiments of the present invention, includes second fastener tongue (1.1) attached or fastened to the main strap apparatus (1.2) at area 3.2, with receiver ring (2) secured to the main strap apparatus (1.2) at area 3.1. Area 3.3 is designated the center point for which to mount or fix the novel fastener strap to an item should one use the present invention in such a way.

Figure 2A:
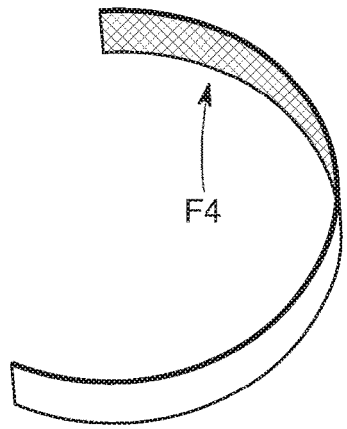
FIG. 2A depicts a top perspective view of an exemplary second fastener tongue of the strap enclosure.
Figure 2B:
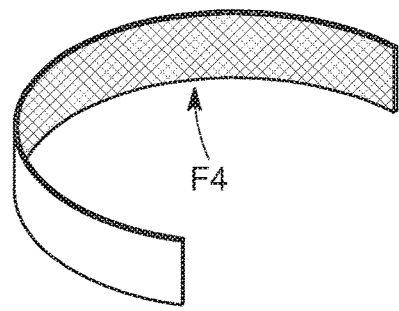
FIG. 2B depicts a first side perspective view of an exemplary second fastener tongue of the strap enclosure.
Figure 2C:
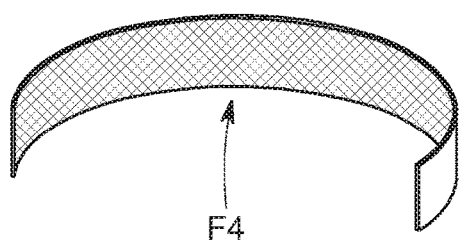
FIG. 2C depicts a second side perspective view of an exemplary second fastener tongue of the strap enclosure.
Figure 2D:
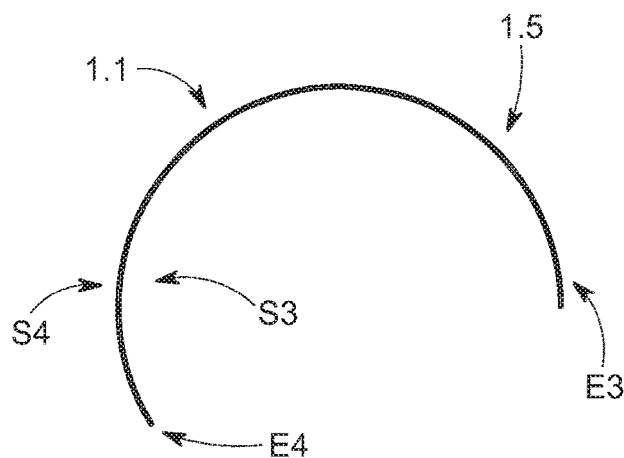
FIG. 2D depicts a top plan view of an exemplary second fastener tongue of the strap enclosure.
Figure 3A:
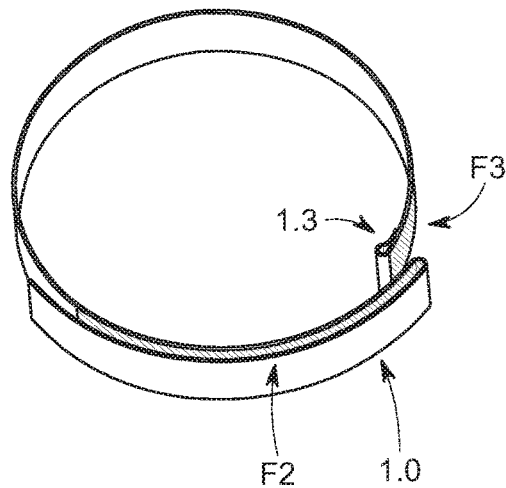
FIG. 3A depicts a top perspective view of an exemplary main strap of the strap enclosure.
Figure 3B:
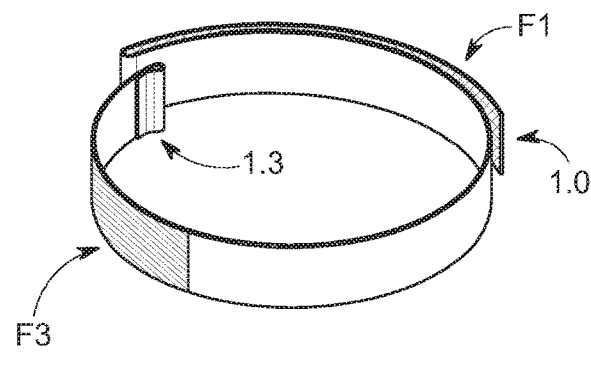
FIG. 3B depicts a first side perspective view of an exemplary main strap of the strap enclosure.
Figure 3C:
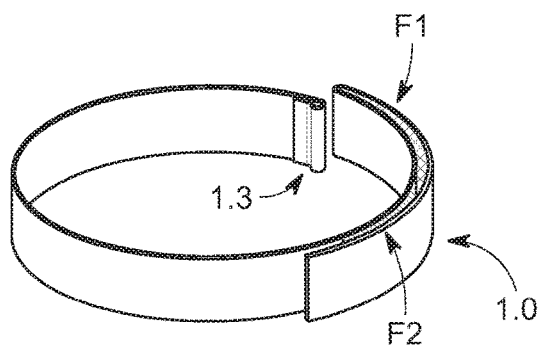
FIG. 3C depicts a second side perspective view of an exemplary main strap of the strap enclosure.
Figure 3D:
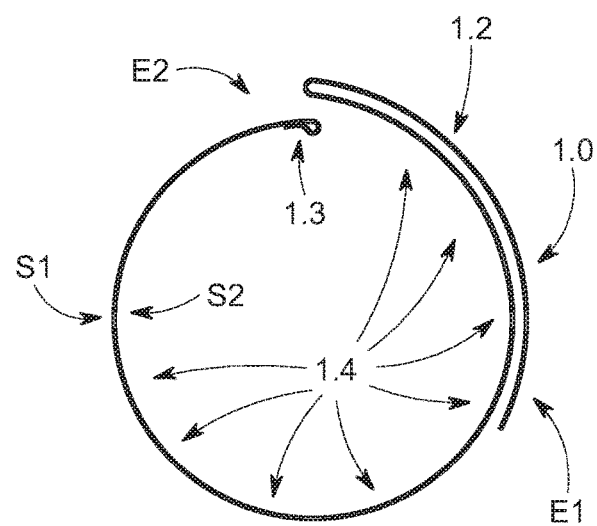
FIG. 3D depicts a top plan view of an exemplary main strap of the strap enclosure.

Also shown are hook and loop style fasteners, depicted in FIGS. 1A-1D, 2A-2D and 3A-3D. Hook style fastener is represented in red, and loop style fastener in blue. Placing the hook and loop fasteners in the opposite assigned locations does not affect the functionality of the novel strap enclosure, and said combinations are entirely within the scope of the invention and it's claims.

Preferred materials for the novel strap enclosure includes but are not limited to various types of webbing made from organic materials such as cotton or hemp, or plastic materials such as nylon, polyester, polypropylene, and/or other plastics variations.

While preferred materials have been described, the device is not limited by these materials. Plastics, rubber, foam, Kevlar and the like, or metal alloys etc. may be used in the manufacturing of various elements of this novel strap enclosure according to various embodiments of the present invention.

I claim:

1. A strap enclosure comprising:
a main strip (1.2) extending from a first end and a second end and having a first side and a second side, the main strip comprising:
   a first fastener tongue disposed at the first end;
   a main strip coupler disposed at the second end; and,
   an intermediate strip portion extending between the first fastener tongue and the first fastener coupler;
a secondary strip comprising a second fastener tongue (1.1) extending from a third end and a fourth end and having a third side and a fourth side, wherein the third end is attached to the main strip at a fixed attachment point (3.2) along the intermediate strip portion; and,
a receiver coupler (2) defining at least one receiver aperture and comprising a first portion and a second portion, wherein the first portion and the second portion are disposed on opposite sides of the at least one receiver aperture and the at least one receiver aperture receives the main strip and the second fastener tongue,
wherein the first fastener tongue comprises a first fastener disposed at the first side of the main strip,
wherein the main strip further comprises:
   a second fastener disposed at the first side of the main strip along the intermediate strip portion, and configured to releasably fasten with the first fastener; and,
   a third fastener disposed at the first side of the main strip and along the intermediate strip portion;
wherein the secondary strip further comprises:
   a fourth fastener disposed at the fourth side of the second fastener tongue, and configured to releasably fasten with the third fastener,
wherein the main strip coupler is retainingly coupled to the receiver coupler at the first portion at an area (3.1),
wherein the main strip is looped around the second portion of the receiver coupler,
wherein when the first and second fastener tongues are inserted through the at least one receiver aperture and pulled in opposite lateral directions to cinch the strap enclosure, the strap enclosure is configured to apply inwardly and radially-directed compression forces throughout the strap enclosure that can be applied to a user with no rotation of the strap enclosure and allows fastening of each tongue on each tongue's respective fastening area of the strap enclosure at a first fastening point associated with the first and second fasteners and a second fastening point associated with the third and fourth fasteners to provide for a double-redundant fastening feature of the strap enclosure, such that when the strap enclosure is closed, the second fastener tongue is disposed between the first portion and the main strap within the at least one receiver aperture.

2. The strap enclosure of claim 1, wherein at least a portion of the main strip and the secondary strip is formed of webbing.

3. The strap enclosure of claim 1, wherein at least a portion of the main strip and the secondary strip is formed of plastic.

4. The strap enclosure of claim 1, wherein the receiver coupler comprises a receiver ring.

5. The strap enclosure of claim 1, wherein the strap enclosure is fixed to an object at a center point (3.3) of the strap enclosure.

6. The strap enclosure of claim 1, wherein the main strip coupler comprises a portion of main strap that is wrapped around the second portion of receiver coupler.

7. The strap enclosure of claim 1, wherein when the strap enclosure is closed, the first fastening point is disposed at a first lateral side of the strap enclosure, and the second fastening point is disposed at a second lateral side of the strap enclosure, the first and second lateral sides being opposed to one another.

8. The strap enclosure of claim 1, wherein the main strip, the secondary strip, and the receiver coupler are all disposed in a common horizontal plane when the strap enclosure is closed.

9. The strap enclosure of claim 1, wherein when the strap enclosure is closed, the main strap extends at least 360 degrees about horizontal a center point of the of the strap enclosure, and the main strap further spirals outward moving along a radial angle at the horizontal center point of the strap enclosure.

10. A strap enclosure comprising:
a main strip (1.2) extending from a first end and a second end and having a first side and a second side, the main strip comprising:
a first fastener tongue disposed at the first end;
a main strip coupler disposed at the second end; and,
an intermediate strip portion extending between the first fastener tongue and the first fastener coupler;
a secondary strip comprising a second fastener tongue (1.1) extending from a third end and a fourth end and having a third side and a fourth side, wherein the third end is attached to the main strip at a fixed attachment point (3.2) along the intermediate strip portion; and,
a receiver coupler (2) defining at least one receiver aperture and comprising a first portion and a second portion, wherein the first portion and the second portion are disposed on opposite sides of the at least one receiver aperture and the at least one receiver aperture receives the main strip and the second fastener tongue,
wherein the first fastener tongue comprises a first fastener disposed at the first side of the main strip,
wherein the main strip further comprises:
a second fastener disposed at the first side of the main strip along the intermediate strip portion, and configured to releasably fasten with the first fastener; and,
a third fastener disposed at the first side of the main strip and along the intermediate strip portion;
wherein the secondary strip further comprises:

a fourth fastener disposed at the fourth side of the second fastener tongue, and configured to releasably fasten with the third fastener,
wherein the main strip coupler is retainingly coupled to the receiver coupler at the first portion at an area (3.1),
wherein the main strip is looped around the second portion of the receiver coupler,
wherein the first and second fasteners comprise a first pair of hook and loop fasteners, and the third and fourth fasteners comprise a second pair of hook and loop fasteners,
wherein when the first and second fastener tongues are inserted through the at least one receiver aperture and pulled in opposite lateral directions to cinch the strap enclosure, the strap enclosure is configured to apply inwardly and radially-directed compression forces throughout the strap enclosure that can be applied to a user with no rotation of the strap enclosure and allows fastening of each tongue on each tongue's respective fastening area of the strap enclosure at a first fastening point associated with the first and second fasteners and a second fastening point associated with the third and fourth fasteners to provide for a double-redundant fastening feature of the strap enclosure, such that when the strap enclosure is closed, the second fastener tongue is disposed between the first portion and the main strap within the at least one receiver aperture.

11. The strap enclosure of claim 10, wherein at least a portion of the main strip and the secondary strip is formed of webbing.

12. The strap enclosure of claim 10, wherein at least a portion of the main strip and the secondary strip is formed of plastic.

13. The strap enclosure of claim 10, wherein the receiver coupler comprises a receiver ring.

14. The strap enclosure of claim 10, wherein the strap enclosure is fixed to an object at a center point (3.3) of the strap enclosure.

15. The strap enclosure of claim 10, wherein the main strip coupler comprises a portion of main strap that is wrapped around the second portion of receiver coupler.

16. The strap enclosure of claim 10, wherein when the strap enclosure is closed, the first fastening point is disposed at a first lateral side of the strap enclosure, and the second fastening point is disposed at a second lateral side of the strap enclosure, the first and second lateral sides being opposed to one another.

17. The strap enclosure of claim 10, wherein the main strip, the secondary strip, and the receiver coupler are all disposed in a common horizontal plane when the strap enclosure is closed.

18. The strap enclosure of claim 10, wherein when the strap enclosure is closed, the main strap extends at least 360 degrees about horizontal a center point of the of the strap enclosure, and the main strap further spirals outward moving along a radial angle at the horizontal center point of the strap enclosure.

* * * * *